United States Patent Office 3,250,773
Patented May 10, 1966

3,250,773
PURIFICATION OF MELAMINE
Ivan Christoffel, Hopewell, Elmer Lionel Nelson, Chester, and Delbert Proctor Schutz, Hopewell, Va., assignors to Allied Chemical Corporation, New York, N.Y., a corporation of New York
No Drawing. Filed May 29, 1963, Ser. No. 284,023
4 Claims. (Cl. 260—249.7)

This invention relates to a process for the purification of a crude melamine containing impurities including hydroxy-triazines. More specifically, this invention relates to a process for the recovery of a purified melamine free from discoloration from a melamine synthesis effluent obtained by heating an aquo-ammono carbonic acid to form melamine. In these effluents the melamine is accompanied by genetic impurities, including hydroxy-triazines, as well as color-forming impurities.

It is known that by heating an aquo-ammono carbonic acid, e.g., urea, biuret, cyanuric acid, ammelide or ammeline, alone or together with added ammonia, melamine is produced under suitably high temperatures and pressures. When an aquo-ammono carbonic acid, such as urea, is thus heated to produce melamine, it is known to quench the hot pyrolysis effluent with water to obtain a hot aqueous slurry or solution of melamine containing impurities and residual unreacted urea. This hot, e.g. 90° C. to 150° C. melamine solution under atmospheric or somewhat elevated pressure, is separated from the ammonia and carbon dioxide evolved under the lowered presure and is treated with activated charcoal and filtered to remove undissolved material. The filtrate is cooled to temperatures of the order of 50° C. or lower at which the melamine crystallizes. The melamine is separated from its mother liquor and dried. The crude melamine thus produced usually contains about 96–97% melamine and may have a reddish coloration. Recrystallization by repeated solution in hot water and crystallization of the melamine serves to reduce the impurity content of the thus recovered melamine product. But from the standpoint of practical application, there is a point below which the relative solubilities in water of the melamine and accompanying impurities will not permit further purification by this procedure. This point is reached while the recovered product still contains more than 1% impurities and less than 99% melamine, and an undesirably high degree of discoloration.

It has been proposed in U.S.P. 2,647,119, issued July 28, 1953, to dissolve a crude melamine, generally one prepared from dicyandiamide, in water containing melamine in solution. Insoluble material is filtered off and an alkali metal or alkaline earth metal hydroxide is added to the filtrate in an amount carefully regulated to give a solution having a pH of about 11.5 to below 13, from which the melamine is crystallized. Hydroxy-triazine contaminants present in the crude melamine remain in solution in the aqueous caustic liquor. This procedure has several limitations. Particularly, it requires a close control of the concentration of the caustic alkali present in the solution. Also the relatively low temperature of 100° C. or below, at which the solution of melamine is treated with the caustic, limits the amount of melamine which may be recovered from the treated solution by cooling it.

We have now discovered that by the following procedure a highly purified melamine may be obtained from a crude melamine produced by heating an aquo-ammono carbonic acid and accompanied by genetic impurities, including hydroxytriazine. The crude melamine including genetic impurities and color forming impurities is digested in oxygen-saturated aqueous ammonia maintained at a concentration of about 8% to about 28% $NH_3$ by weight based on the ammonia and water present at about 140° C. to about 230° C. The crude melamine may be dispersed in the aqueous ammonia either in the form of a solution or as solid suspended in a solution of the materials present. No more than about ¾% $CO_2$, by weight of total material, is present during this digestion of the crude melamine. The resulting solution of melamine in aqueous ammonia is filtered and the melamine is separated by crystallization from genetic impurities which have been solubilized (made more soluble in aqueous ammonia) by the foregoing digestion with hot aqueous ammonia. The solid purified melamine thus obtained, is separated from its mother liquor containing in solution the solubilized impurities. It may be dried to obtain a white solid, dry product suitable for marketing.

In preferred operation of our process, the amount of aqueous ammonia employed for this digestion of the crude melamine is sufficient to dissolve the melamine in the aqueous ammoniacal solution at the elevated temperature employed for the digestion. On the other hand, the digestion may be carried out employing insufficient aqueous ammonia to dissolve all the melamine present. In that case, however, additional water should be added to the digestion product and the melamine dissolved in the hot, aqueous ammoniacal liquor thus obtained before the solution is filtered and cooled or concentrated to crystallize out the purified melamine. It is preferred to prepare a hot solution of the melamine in a 12% to 24%, by weight, aqueous ammonia saturated with melamine at a temperature above 155° C., and to crystallize the purified melamine from the filtrate by cooling it to a temperature in the range about 30° C. to about 60° C.

The time required for digesting the crude melamine will vary according to the concentration of aqueous ammonia present and the temperature at which the digestion treatment is carried out. The lower the concentration of the ammonia present in the range 8% to 28% and the lower the temperature in the range 140° C. to 230° C. at which the digestion is carried out, the longer the time required to digest the impurities present to obtain an aqueous ammoniacal solution of the melamine and solubilized impurities from which melamine of the required degree of purity crystallizes. In initially operating a process under selected conditions within the limits set forth herein, the digestion time required to obtain the desired purity or melamine in the product higher than that in the initial crude melamine is a matter of routine plant control procedure of sampling and analyzing the purified melamine product; for example, analyzing for melamine content by the procedure described in American Cyanamid Company's bulletin "Chemistry of Melamine," published 1954 (Leaf 65–3–7500–3/54).

Merely digesting the crude melamine in the hot aqueous ammonia followed by filtration and recrystallization is not sufficient to produce a melamine product free from hydroxy-triazine impurities and from a reddish coloration which renders it undesirable for many applications. We have found, however, that such a product can be obtained using this procedure, by first stripping from the crude melamine effluent at least all but ¾% of its carbon dioxide content and saturating the digestion mixture of melamine and 8–28% aqueous ammonia with oxygen.

The melamine synthesis effluents from the high temperature reaction of an aquo-ammono carbonic acid, after quenching with water, and separating the gases evolved under reduced pressure, contain amounts of carbon dioxide which, when the pyrolysis product is mixed with water and ammonia, will give a mixture containing more than the maximum of ¾% $CO_2$ which should be present in the digestion step of the process of our invention. This is the case even though much of the carbon dioxide formed during the pyrolysis of the aquo-ammono carbonic acid to form melamine may be evolved as a gas upon reduction of the pressure. Accordingly, employing our invention for the treatment of the synthesis effluent, it is stirpped of carbon dioxide, preferably by stripping with steam at temperatures of about 100° C. or higher. Its carbon dioxide content is reduced to an amount such that, with addition to the stripped material of such ammonia and water as are required in the digestion step of our process, the carbon dioxide content of the material undergoing digestion is no greater than ¾%. Preferably, this material is substantially free from carbon dioxide.

Under atmospheric pressure, ammonia and water would be vaporized from the liquor present in the digestion step at temperatures of about 140° C. and higher. This step, therefore, must be carried out under super-atmospheric pressures to maintain in the liquor the aqueous ammonia of the required concentration and amount during the digestion of the crude melamine.

The amount of oxygen used is not critical provided enough is used to saturate the digestion mixture. The oxygen may be added prior to the digestion or it may be added during digestion, provided that a substantial part of the digestion is carried out after the oxygen is added.

In employing the process of our invention for the purification of crude melamine, minor amounts of undissolved material may be, and usually are, present in the digested melamine. These are removed by filtration of the aqueous ammoniacal solution of the digested material. Any residual color-forming impurities, which may be present in crude melamine, are removed by passing this filtered solution in contact with activated carbon. However, it is to be emphasized that this charcoal treatment is not sufficient unless the steps of removing carbon dioxide and saturating the digestion mixture with oxygen have been performed. The hot, digested ammoniacal solution of melamine thus treated is then cooled to crystallize melamine. This melamine is separated from its mother liquor, washed with aqueous ammonia solution to remove adhering mother liquor, and is dried in the usual manner to remove the accompanying water and ammonia.

The mother liquor and wash liquors separated from the crystallized melamine, are preferably distilled to recover their ammonia content and then cooled to crystallize out a mixture of ammelide and ammeline which is separated from the mother liquor. This mother liquor which contains melamine and residual ammelide and ammeline is best employed, together with make-up water as needed, for quenching a hot melamine effluent from which a purified melamine is to be recovered by our process. In this manner substantially all the melamine in a melamine synthesis effluent treated by our process is recovered as a pure melamine product and the hydroxy-triazines are recovered as a by-product. This by-product is preferably incorporated with the aquo-ammono carbonic acid from which the melamine is produced and is thus converted into melamine and is recovered in the purified melamine product of our process.

Our novel procedure in which the crude melamine is stripped of carbon dioxide and digested in aqueous ammonia in the presence of oxygen prior to crystallizing melamine from filtered aqueous ammoniacal solution, serves to recover a melamine product of high purity (99% or higher melamine content) with only this one crystallization step. A product analyzing 99.5% or higher melamine and substantially free from discoloration, insolubles and other impurities is thus readily obtained from the crude melamine. The product is suitably used for the production of melamine-formaldehyde resins and other purposes for which a pure melamine is required.

Our invention is further illustrated by the following specific example which illustrates that invention. In the example amounts of materials are by weight unless otherwise stated. The stated amounts of water present in the several compositions are by difference between 100% and the total percentages of the other materials present. The invention is, however, not limited to the particular procedure of operating conditions of the example.

*Example 1*

Molten urea was supplied to a melamine reactor in which it was heated under a pressure of 2000 p.s.i.g. at a temperature of 425 °C. A synthesis effluent containing the following materials was withdrawn from the melamine reactor through a pressure release valve:

|  | Percent |
|---|---|
| Melamine | 33.0 |
| Ammelide+ammeline | 2.4 |
| Urea+biuret | 1.8 |
| $NH_3$ | 27.4 |
| $CO_2$ | 35.4 |

The effluent was quenched to about 110° C. with recycled aqueous mother liquor hereinafter particularly described.

The quenched effluent was passed into a stripper in which ammonia and carbon dioxide were stripped from the material by direct contact with steam at 100°–115° C. under a pressure of 10 p.s.i.g. Ammonia and carbon dioxide, accompanied by water vapor, were taken off overhead and a melamine slurry of the following composition was withdrawn from the bottom of the steam stripper:

|  | Percent |
|---|---|
| Melamine | 16.4 |
| Ammelide+ammeline | 1.2 |
| Biuret+urea | 0.8 |
| Water | 81.6 |

$CO_2$ trace.

Anhydrous liquid ammonia was introduced into the slurry from the stripper in the weight ratio of 1 part $NH_3$/6.5 parts $H_2O$ present in the slurry, equivalent to a 13.3% aqueous ammonia. This ammoniacal slurry was saturated with oxygen and introduced into a stainless steel digester where it was heated to and maintained at 170°–180° C. by adding steam directly. It was held at 170°–180° C. and under pressures in the range 250–300 p.s.i.g. for a residence period of 30 minutes. The solution drawn from the digester contained 0.5% $CO_2$ and amounts of $NH_3$ and water corresponding to a 12.0% aqueous ammonia.

The solution from the digester was filtered to remove any solids present, passed through a bed of activated carbon, and then cooled in a crystallizer from the temperature of 170°–180° C. at which it was withdrawn from contact with the activated carbon, to 50° C. to crystallize melamine. The crystallizer was operated under a pressure of 95–100 p.s.i.g. to hold the ammonia present in solution in the liquor from which the melamine is crystallized. The slurry from the crystallizer was thickened in a slurry thickener, and the thickened slurry passed to a centrifuge where the crystallized melamine was separated from its mother liquor and washed with a 12% aqueous ammonia before being withdrawn and dried to obtain a purified white melamine product containing 99.6% melamine with less than 0.1% ammelide+ammeline.

The combined mother liquors and wash liquor from the slurry thickener and centrifuge were passed into an ammonia still. The ammonia, accompanied by a small amount of oxygen and carbon dioxide, was removed from the liquor by steam distillation. This is preferably carried out under about 235 p.s.i.g pressure with top and bottom of column temperature of about 44° C. and 205° C. respectively. The aqueous solution leaving the bottom of the column was passed to a flash crystallizer in which it was cooled to about 100° C. The ammelide and ammeline which precipitated out was filtered from the mother liquor in a filter and was incorporated with molten urea passed into the melamine reactor for conversion to melamine together with the urea. The mother liquor from the filter, containing residual melamine and a small amount of ammelide+ammeline, was recycled together with make-up water and employed for quenching hot effluent from the melamine reactor. In this manner a high yield of the pure melamine is obtained, based on the urea supplied to the process.

When the foregoing example was repeated without saturating the melamine-aqueous ammonia digestion mixture with oxygen, the final melamine product had a reddish coloration.

We claim:

1. In the process for purifying melamine, produced by heating at least one of the aquo-ammono carbonic acids and accompanied by genetic and color forming impurities (including a hydroxy-triazine), by digesting a dispersion of said melamine in aqueous ammonia at temperatures in the range of about 140° to about 230° C. while maintaining the concentration of aqueous ammonia in the range of about 8% to about 28% ammonia by weight of the ammonia and water present, and maintaining the carbon dioxide content at no more than about 3/4% by weight of said dispersion, filtering the solution of thus treated melamine in aqueous ammonia and thereafter crystallizing from the filtrate a purified melamine, the improvement which comprises saturating the dispersion of melamine with oxygen.

2. The process of claim 1 wherein the dispersion of melamine is saturated with oxygen prior to its digestion.

3. The process of claim 1 wherein the digested melamine dispersion is filtered through carbon.

4. The process of claim 2 wherein the digestion is carried out in the stainless steel vessel.

References Cited by the Examiner

UNITED STATES PATENTS

| | | | |
|---|---|---|---|
| 2,647,119 | 7/1953 | Haworth et al. | 260—249.7 |
| 2,863,869 | 12/1958 | Elmer et al. | 260—249.7 |
| 2,918,467 | 12/1959 | Hibbitts et al. | 260—249.7 |

FOREIGN PATENTS 503,463    6/1954    Canada.

WALTER A. MODANCE, *Primary Examiner.*

NICHOLAS S. RIZZO, MARION W. WESTERN, JOHN M. FORD, *Assistant Examiners.*